(12) United States Patent
Ohmoto et al.

(10) Patent No.: US 6,534,730 B2
(45) Date of Patent: Mar. 18, 2003

(54) ROTATIVELY-OPERATED SWITCH APPARATUS AND COMMUNICATION TERMINAL APPARATUS

(75) Inventors: Junya Ohmoto, Kanagawa (JP); Satoshi Mitsuma, Tokyo (JP); Yuji Haraguchi, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/843,298

(22) Filed: Apr. 25, 2001

(65) Prior Publication Data

US 2002/0011402 A1 Jan. 31, 2002

(30) Foreign Application Priority Data

Apr. 27, 2000 (JP) ........................................ 2000-127119

(51) Int. Cl.$^7$ ................................................ H01H 9/00
(52) U.S. Cl. ........................... 200/4; 200/5 R; 200/17 R
(58) Field of Search ........................... 200/4, 5 R, 6 R, 200/11 R, 11 TW, 17 R, 18

(56) References Cited

U.S. PATENT DOCUMENTS 6,016,139 A * 1/2000 Terasawa et al. ........... 345/169
6,178,338 B1 * 1/2001 Yamagishi et al. .......... 455/566
6,211,474 B1 * 4/2001 Takahashi .................... 200/18
6,291,782 B1 * 9/2001 Isikawa ....................... 200/14
6,396,016 B1 * 5/2002 Lin et al. ..................... 200/564

* cited by examiner

Primary Examiner—Elvin Enad
Assistant Examiner—Kyung S. Lee
(74) Attorney, Agent, or Firm—Jay H. Maioli

(57) ABSTRACT

A communication terminal apparatus includes a disc member that is supported such that a portion thereof protrudes outside the body case, and that is rotated to output a signal corresponding to its rotation direction and rotation angle; first switch operated by pressing the disc member toward the body case; second and third switches separately operated by pivoting the disc member about a pivot axis parallel to the rotation plane and orthogonal to the pressing direction; a storage device storing a plurality of items; a display device displaying a cursor and a plurality of items read from the storage device; and a control device for moving the cursor displayed in the display device and for selecting and executing the displayed items or other items required for communications in accordance with the operations of the disc member and the first, second, and third switches.

6 Claims, 7 Drawing Sheets

ROTATIVELY-OPERATED SWITCH APPARATUS AND COMMUNICATION TERMINAL APPARATUS

BACKGROUND OF THE INVENTION

1. Technical Field of the Invention

The present invention relates to a rotatively-operated electronic component with a push switch which is usable in various electronic devices such as a portable device.

2. Description of the Related Art

A rotatively-operated electronic component having a disc member made to output a signal in accordance with a rotation direction and a rotated angle produced by its rotation, and a switch operated by pushing operation of the disc member in a direction orthogonal to a rotation axis of the disc member is known as a jog dial. Such the rotatively-operated electronic component is used, for example, for selecting an item on a display by rotating operation of the disc member, deciding the selected item by the pushing operation of the disc member or executing the decided item by further pushing operation of the disc member.

In another example of such the rotatively-operated electronic component disclosed in Japanese Patent Application Laid-open 11-163997, in addition to the above switch (a first switch), another switch (a second switch) is provided. The second switch is operated by pivoting the disc member to one direction about a pivot axis parallel to the rotation plane of the disc member and orthogonal to the pushing direction. By operating this second switch, a function such as canceling (clearing) once decided item is performed, which has been made conventionally by the other operating element such as a pressing operation key.

By providing the second switch, a number of operations may be performed by operating only the disc member, whereby operability extremely increases. Particularly, in a communication terminal apparatus such as a portable phone, a number of operations may be performed with one finger of a thumb or a forefinger while holding it in a hand, thus providing an extremely convenient handling capability.

SUMMARY OF THE INVENTION

It would be desired to provide a further increase of the operability in such apparatus.

For example, when the disc member is pivoted about the pivot axis parallel to the rotational plane of the disc member and orthogonal to the pushing direction, operability of the apparatus will be improved further if two switches are provided for being operated by pivoting operations to two directions instead of pivoting the one direction.

Accordingly, an object of the present invention is to provide means to improve the operability of an apparatus having a rotatively-operated electronic component.

A rotatively-operated switch apparatus according to an embodiment of the present invention is characterized to include a rotating operation unit capable of accepting rotating operation and pressing operation in a direction orthogonal to a rotation axis of the rotating operation and outputting a signal in accordance with a rotational movement of the rotating operation, a first push switch operated by pressing the rotating operation unit, and a second and a third push switches disposed at both sides of the rotation plane of the rotating operation unit and operated by pivoting about a pivot axis parallel to the rotation plane of the rotating operation unit and orthogonal to the direction of the pressing operation.

Accordingly, the rotatively-operated switch apparatus according to an embodiment of the present invention may perform separate operations by operating the rotating operation unit into five directions, namely, the rotating operation to two directions, the pushing operation, and the pivoting operation to two directions about the pivot axis parallel to the rotation plane of the disc member and orthogonal to the pressing direction. Each of the operations may be provided with different meanings respectively. Accordingly, a number of items may be processed by operating only the rotating operation unit whereby the operability is extremely increased.

A communication terminal apparatus according to an embodiment of the present invention is characterized to include a housing member, a rotating operation unit which is supported in such a way that a portion thereof protrudes into the housing member, for accepting rotating operation and pressing operation in a direction orthogonal to a rotation axis of the rotating operation, and outputs a signal in accordance with rotational movement of the rotating operation, a first push switch disposed within the housing member and operated by the pressing operation of the rotating operation unit, a second and a third push switches disposed at both sides of the rotation plane of the rotating operation unit within the housing member and are respectively operated by pivoting the rotation operation unit about the pivot axis parallel to the rotation plane of the rotating operation unit and orthogonal to the direction of the pressing operation, to the both sides of the rotation plane of the rotating operation unit, a storage device for storing a plurality of items, a display device for displaying a plurality of the items read from the storage device, and a control device for conducting selection and execution of the items displayed on the display device, and selection and execution of the function required for communications in accordance with the rotation of the rotating operation unit and the operation of the first to the third push switches.

Accordingly, the communication terminal apparatus according to the present invention may effect operation of the rotating operation unit to five directions, namely, the rotating operation to two directions, the pressing operation, and the pivoting operation toward two directions about the pivot axis parallel to the rotation plane of the rotating operation unit and orthogonal to the pressing direction, each operation being provided with different meanings respectively. Therefore, many items may be processed by only operating the rotating operation unit. For example, by holding the apparatus in a hand, considerably many items may be processed only by bending, stretching, pressing down or sliding of the thumb or the forefinger, whereby convenience in handling is extremely increased.

Other and further objects, features and advantages of the present invention will appear more fully from the following description.

DESCRIPTION OF THE PREFERRED EMBODIMENTS

Hereunder, referring to the attached drawings, there are described embodiments in which a rotatively-operated electronic component according to the present invention is applied to a portable phone.

Figure 1:
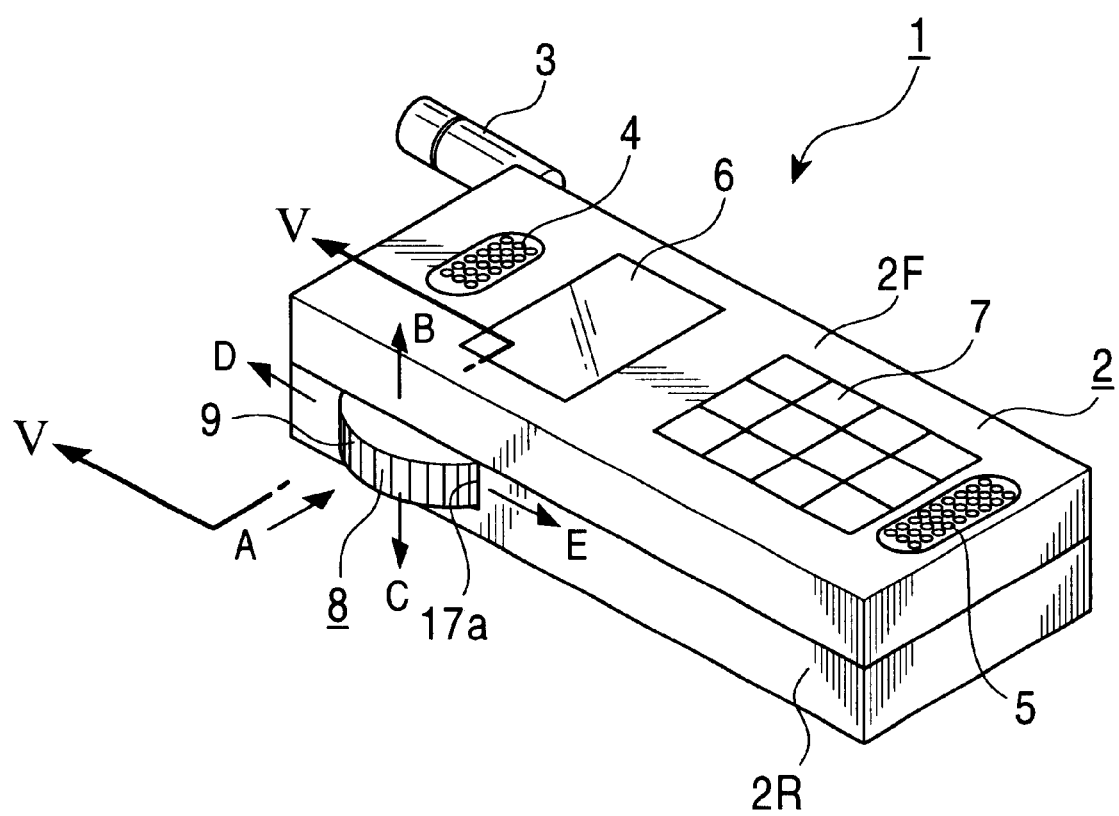
FIG. 1 is a schematic perspective view showing an appearance of a portable phone according to an embodiment of the present invention.

As shown in FIG. 1, the portable phone 1 includes a body case 2 made of synthetic resin, where various kinds of members are housed or mounted. At the upper part of the body case 2, an antenna 3 is installed to be extracted or stowed freely, and through the antenna 3 transmission and reception of radio waves are conducted with base stations.

At the front upper part of the body case 2 is installed a speaker 4 as an electro-acoustic conversion means. When calling, a voice of a called party is outputted from this speaker 4. At the front lower part of the body case 2 is installed a microphone 5 as an acoustic-electronic conversion means. When calling, voice of a user is collected by this microphone 5.

At somewhat upper position from the front center of the body case 2 is installed a liquid crystal display (LCD) 6 as a display means capable of displaying various kinds of information such as receiving condition of radio waves, the amount of battery remaining, telephone numbers of called parties, registered contents as a telephone directory (telephone numbers and names of called parties or the like), outgoing and incoming history, and other kinds of registered contents.

At the front lower half of the body case 2, various operation keys 7 are installed as operating means. By pressing these operation keys 7, input of various instructions, texts or the like may be performed.

Further, at the upper part of the left side surface of the body 2, a jog dial 8 is installed as a different switch apparatus from the operation keys 7. By rotating this jog dial 8, menus displayed on the liquid crystal display 6, scrolling display of various items such as a list of outgoing and incoming history, telephone number list or the like, and a cursor for selecting items, etc., may be displayed. By the pushing operation (pushing-in operation) of the jog dial 8 to the internal direction of the body case 2, the items displayed on the liquid crystal display 6 may be decided or executed. Furthermore, selection or execution of the designated items may also be conducted by moving the jog dial 8 to the rear side of the portable phone along the side surface of the body case 2 to provide the pivoting operation (push-down operation) about the pivot axis parallel to the rotation plane of the jog dial 8 and orthogonal to the pushing-in direction, or by moving the jog dial 8 to the opposite direction of the push-down operation, namely, by moving it to the front side of the portable phone along the side surface of the body case 2 to provide the pivoting operation (push-up operation) about the pivot axis parallel to the rotation plane of the jog dial 8 and orthogonal to the pushing direction. Various operations may be provided. For example, once decided items may be cleared by the push-up operation, and a hierarchy of the menu may be raised by one level during display of the menu or a display of a menu (called catch menu hereafter) by which a user is allowed to select procedures such as hold-on of call, microphone-off or the like when calling may be actuated during calling by the push-down operation.

Figure 2:
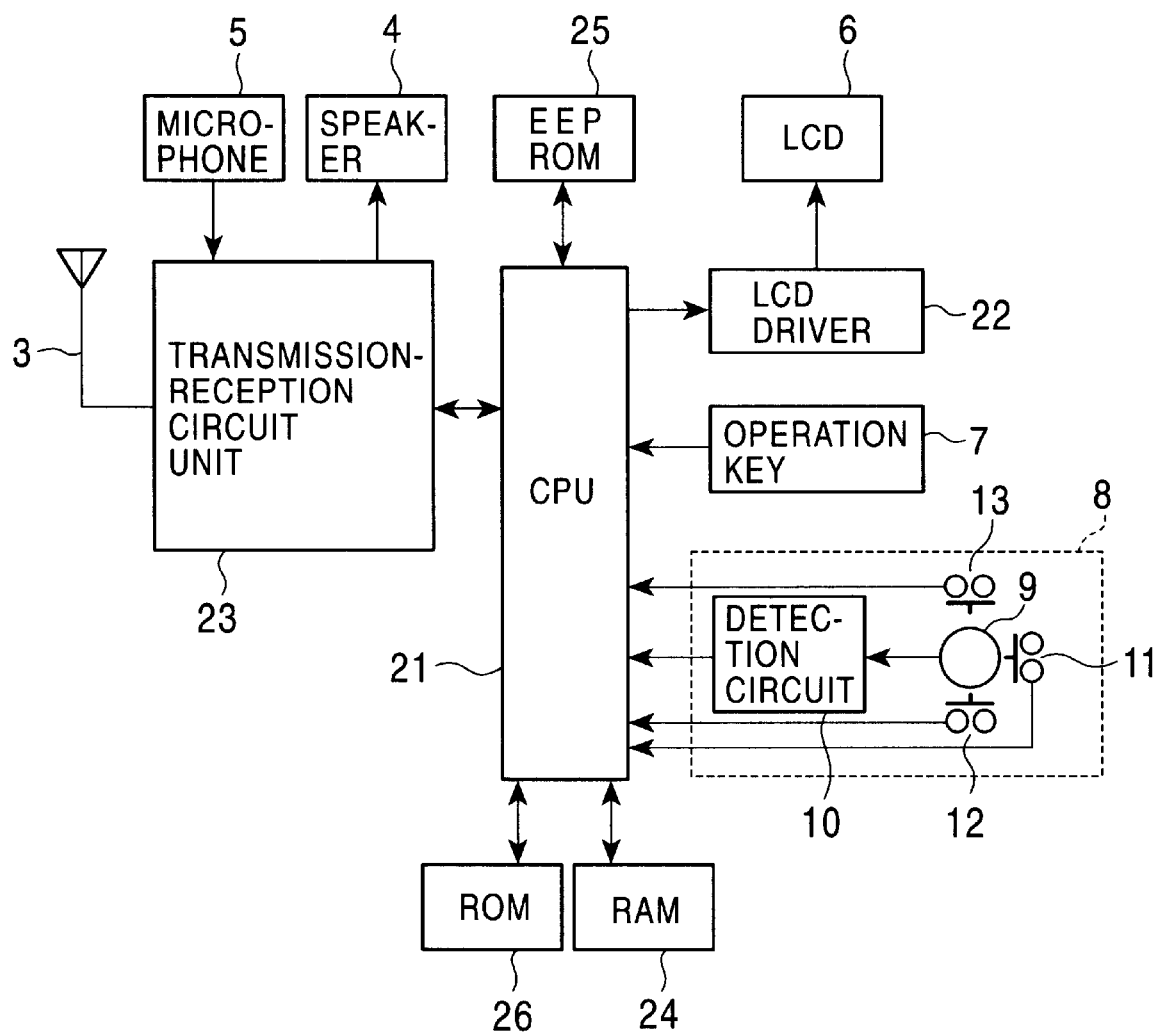
FIG. 2 is a block diagram showing a circuit configuration of the portable phone.

As shown in FIG. 2, the jog dial 8 essentially consist of a disc member 9, a detection circuit 10, and a first to a third switches 11, 12 and 13. When the rotating operation is performed with the disc member 9, its rotation direction and rotation angle are detected by the detection circuit 10, and the result of the detection is outputted to a control means described later. When the disc member 9 is pushed into the interior of the body case 2 by the pushing operation, the first switch 11 is operated, and when the push-down operation is performed with the disc member 9, the second switch 12 is operated, and when the push-up operation is performed with the disc member 9, the third switch 13 is operated. The control means described later is operable to recognize operating condition of these switches, and to conduct various controls in accordance with the rotation direction and the rotation angle of the disc member 9 and the operating condition of the first to the third switches 11, 12 and 13.

Figure 3:
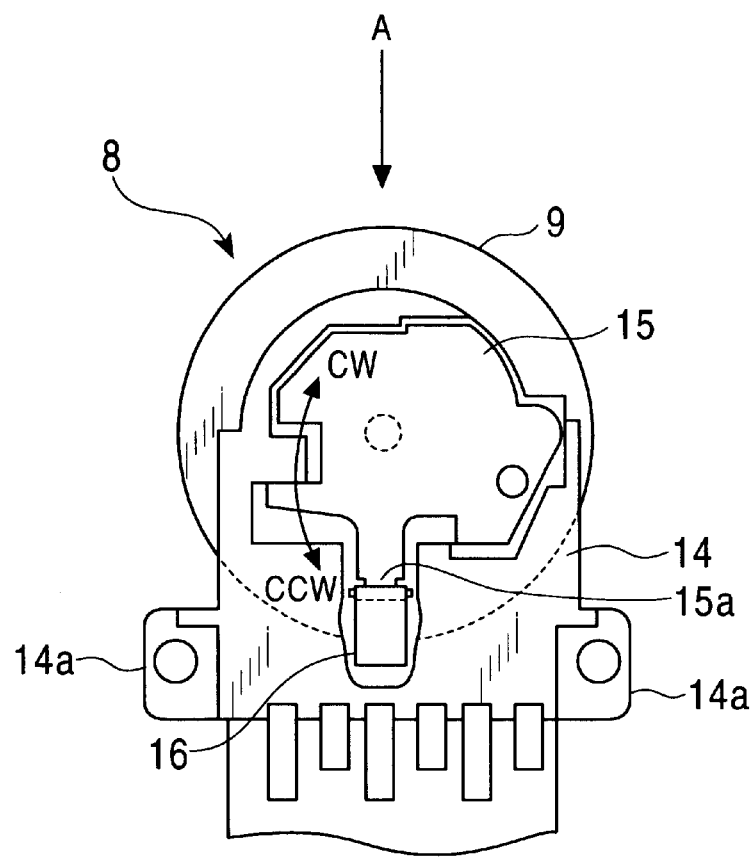
FIG. 3 is a schematic rear view showing a jog dial together with FIG. 4.
Figure 4:
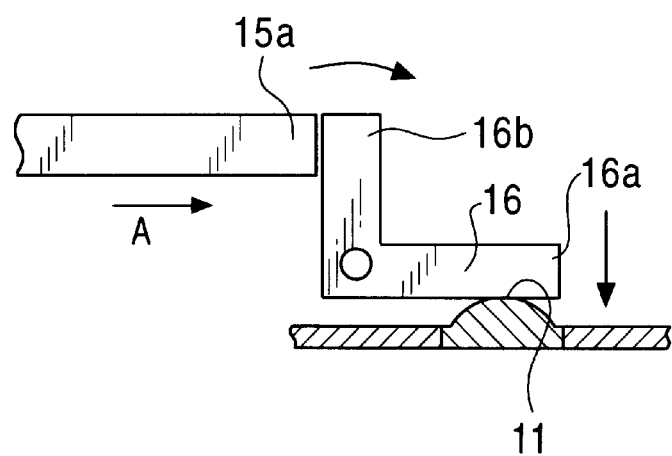
FIG. 4 is an expanded sectional view of a main part of the jog dial.

As shown in FIG. 3, the disc member 9 is supported by a base member 14 made of insulation material to be rotative and movable to the pushing direction, namely, to an arrow A direction in FIG. 3. More specifically, an intermediate supporting plate 15 is supported by the base member 14 with freely pivoting, and the disc member 9 is supported at the position near the pivot edge of the intermediate supporting plate 15. The intermediate supporting plate 15 is impelled to move to a clockwise direction shown in FIG. 3 by a spring member (not shown), namely, to an arrow CW direction in FIG. 3, whereby pivoting to the clockwise direction CW is made to stop at the initial position as shown in FIG. 3. At the rear side of the intermediate supporting plate 15 of the base member 14, an intermediate operation element 16 having the shape of a letter L from side-view is supported with freely pivoting. At the position facing the rear edge 16a of the intermediate operation element 16 of the base member 14, the first switch 11 is disposed. Accordingly, when the disc member 9 is pushed to the pushing-in direction A, the intermediate supporting plate 15 pivots to the counterclockwise direction, namely, to the arrow CCW direction in the drawing, against the impelling force of the spring member (not shown), so that the disc member 9 appears to move to the pushing-in direction A apparently. When the intermediate supporting plate 15 pivots to the counterclockwise direction CCW, a front edge 16b of the intermediate operation element 16 is pressed by a rear edge 15a of the intermediate supporting plate 15, and the intermediate operation element 16 is pivoted such that the rear edge 16a moves to the first switch 11, and pushes down the first switch 11, whereby a signal is outputted to the effect that the push-down operation is conducted by the first switch 11. When the force of pushing the disc member 9 to the pushing-in direction A is removed, the intermediate supporting plate 15 pivots to the clockwise direction CW by the impelling force of the spring member and returns to the initial position. On the base member 14, two supported pieces 14a, 14a are formed, each protruding to the opposite directions with respect to the direction orthogonal to the pushing-in direction A and parallel to the rotation plane of the disc member 9.

FIG. 3 shows that the disc member 9 is supported by the intermediate supporting plate 15 which is freely pivoting, but the disc member may also be supported by an intermediate supporting plate which, when being pushed, slides straight to the pushing-in direction A with respect to the base member.

Figure 5:
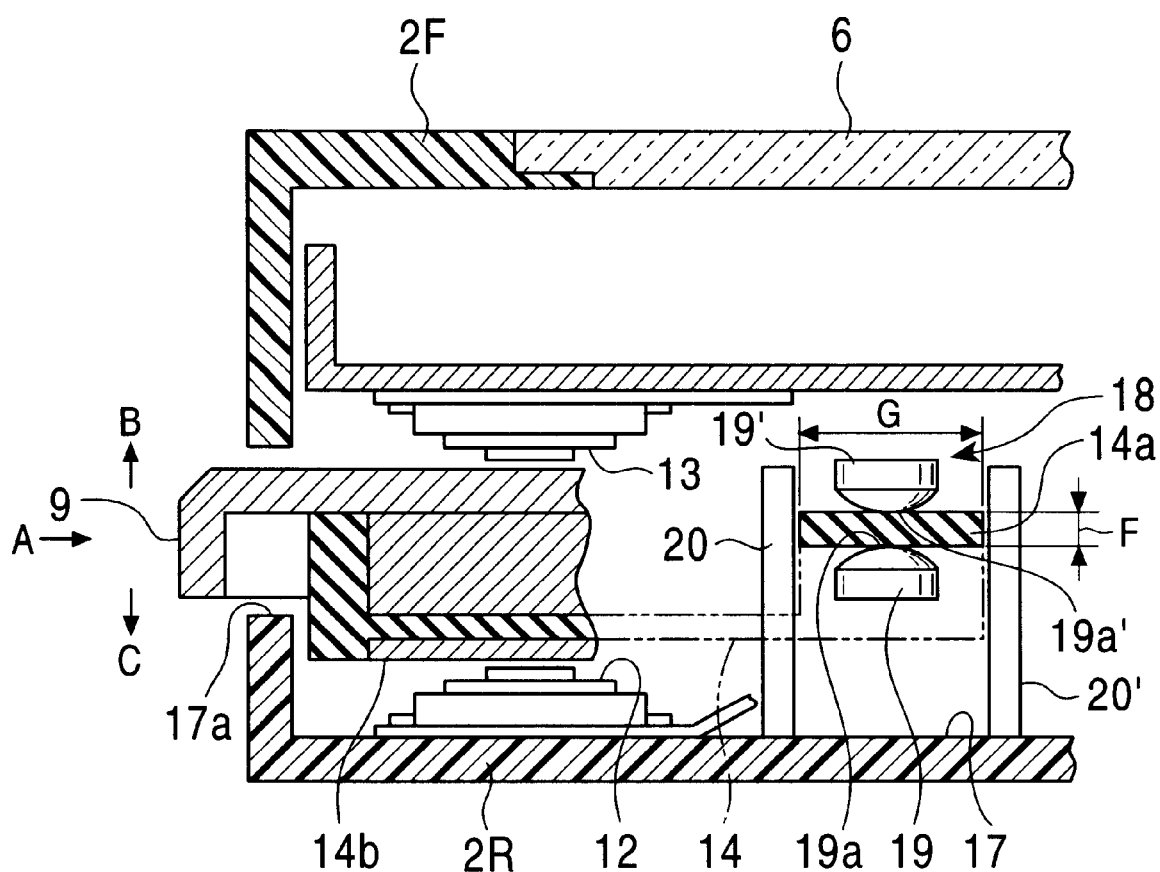
FIG. 5 is an expanded sectional view taken along line V—V of FIG. 1.

As shown in FIG. 5, the disc member 9 consists of two discs, namely, a stationary fixed disc and a rotating disc which is disposed coaxially with the fixed disc and rotative with respect to the fixed disc. At the portion near the rim of the rotating disc facing the fixed disc, there exist a pair of counter electrodes, each being spaced and facing in the direction of the radius. These counter electrodes contact on-the-slide with pairs of counter electrodes formed at the portion near the rim of the fixed disc. The counter electrodes of the fixed disc, both in the outer and in the inner circumference, are disposed in a little displacement with respect to the circumferential direction. For example, when the counter electrodes of the rotating disc contact the counter electrodes of the fixed disc, and by putting the counter electrodes of the rotating disc to be at grounding potential, rotating angle may be detected by counting the number of times when the counter electrodes of the rotating disc fall to the grounding potential. Regarding the counter electrodes of the fixed disc, those of the outer circumference and the inner circumference are disposed in a little displacement with respect to the circumferential direction, so that the electrodes which earlier fall to the grounding potential according to the direction of rotation are different between those of the outer circumference and those of the inner circumference. Such being the case, rotation direction may be detected according to which electrodes fall earlier to the grounding potential. Therefore, by detecting by means of the detection circuit 10 the number of times when the counter electrodes fall to the grounding potential and which electrodes of the outer or inner circumference fall earlier to the grounding potential, a control means described later may know the rotation direction and the rotation angle of the disc member 9, thereby capable of performing the required control.

Figure 6:
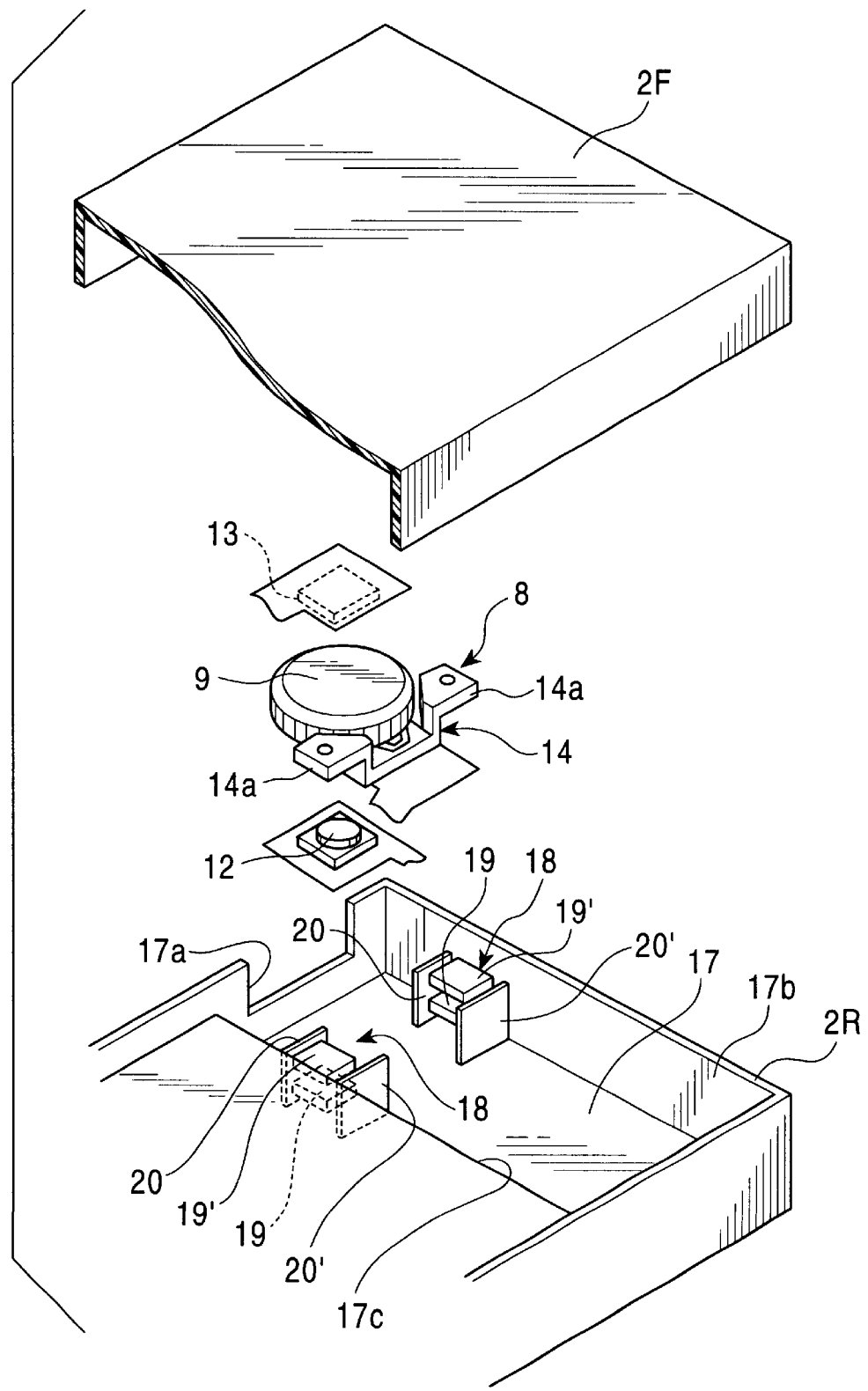
FIG. 6 is an exploded perspective view of a main part of the jog dial.
Figure 7:
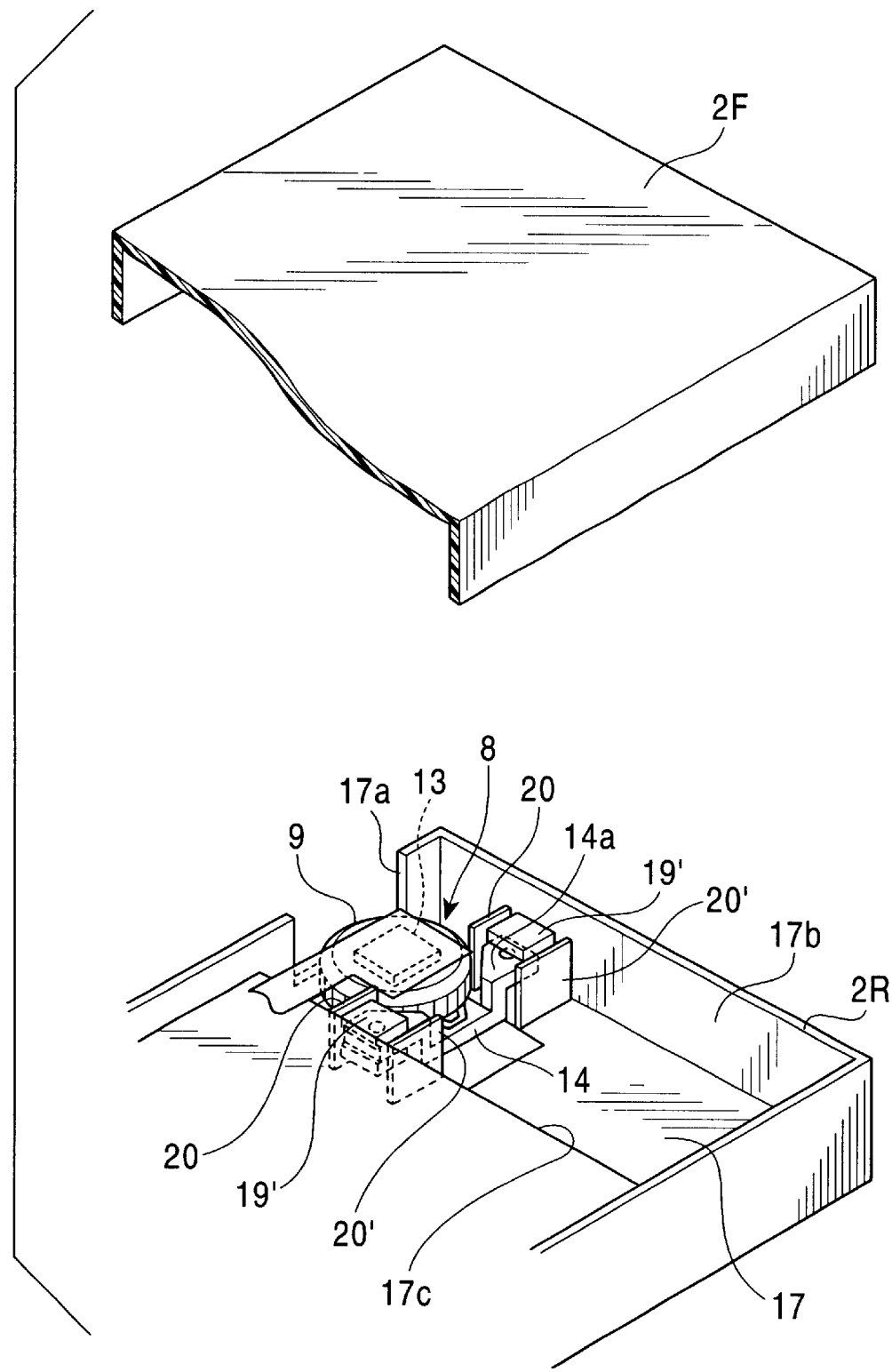
FIG. 7 is a perspective view of a main part of the jog dial.

As shown in FIGS. 5–7, the body case 2 is formed with a front case 2F and a rear case 2R. In the rear case 2R is formed a placement unit 17 of the jog dial 9. The placement unit 17 is formed long recessed in the lateral direction, and a notch 17a is opened at the side surface in the left side. At the side walls 17b and 17c facing each other at the top and the bottom of the placement unit 17, are provided pivoting fulcrums 18.

The pivoting fulcrum 18 is composed of two supporting pieces 19, 19', each facing spaced in the longitudinal direction, namely, to arrows B and c directions in FIG. 1, and position control pieces 20, 20', each located at the left and right sides of the two supporting pieces 19, 19'. The surfaces of the supporting pieces 19, 19' facing with each other are formed to shape protruded curve surfaces 19a, 19a' viewing in the vertical direction, namely, viewing in arrows D and E directions in FIG. 1. The space of the most narrow portion between the two protruded curve surfaces 19a and 19a' is made to be the same as or a slightly larger than a thickness F of the supported piece 14a of the base member 14 of the jog dial 9. The space between the two position control pieces 20 and 20' is made to be a little larger than a width G of the supported piece 14a.

The supported piece 14a of the base member 14 is respectively inserted between the supporting pieces 19 and 19' of the respective pivoting fulcrum 18, and sandwiched by the respective protruded curve surfaces of 19a, 19a', and a portion of the disc member 9 is made to protrude outside the body case 2 through the notch 17a. Movement thereof in the lateral direction is controlled by the position control pieces 20, 20'. Within the rear case 2R, at the opposite surface to the surface of the base member 14 which supports the disc member 9, namely, at the position facing the rear surface 14b is disposed the second switch 12. At the position facing the disc member 9 of the front case 2F is disposed the third switch 13.

Accordingly, by rubbing with a finger pad or the like the portion of the disc member 9 protruding outside the body case 2 to move upward, namely, to an arrow D direction in FIG. 1, or to the rear side direction, namely, to an arrow E direction in FIG. 1, the disc member 9 is rotated to be able to output a signal in accordance with its rotating direction and rotating angle, and by pushing to an arrow A direction, the first switch 11 is pushed down to be able to output the adapted signal. By pushing to the rear side direction with the finger pad or the like the portion of the disc member 9 protruding outside the body case 2, namely, by pushing to an arrow C direction, the disc member 9 and the base member 14 supporting thereof are made to pivot to the rear side direction about the supported pieces 14a serving as pivoting fulcrums supported by the supporting pieces 19, 19', whereby the second switch 12 is pushed down with the rear surface 14b of the base member 14 to output the adapted signal. Furthermore, by pushing to the front side direction with the finger pad or the like the portion of the disc member 9 protruding outside the body case 2, namely, by pushing to an arrow B direction, the disc member 9 and the base member 14 supporting thereof are made to pivot to the front side direction about the supported pieces 14a serving as pivoting fulcrums supported by the supporting pieces 19, 19', whereby the third switch 13 is pushed down with the front surface of the disc member 9 to be able to output the adapted signal.

Moreover, the space between the control pieces 20 and 20' is made a little larger than the width G of the supported piece 14a of the base member 14, so that the supported piece 14a may move freely within the space surrounded by these control pieces 20, 20' and the supporting pieces 19, 19' without being provided with stress, whereby occurrence of plastic deformation on the supported piece 14a and the other parts of the base member 14 may be prevented.

Next, referring to FIG. 2, there is described an outline of the circuit configuration of the portable phone 1 according to the present invention.

Firstly, command information inputted from the above-described various means such as operation keys 7 or the jog dial 8 is inputted to a CPU (Central Processing Unit) 21. The CPU 21, based on the inputted command information, controls an LCD driver circuit 22 and displays on the liquid crystal display 6 various information according to the command information (for example, telephone number being inputted, menu items, or outgoing history, telephone directory information or the like). The CPU 21, based on command information being inputted, controls a transmission-reception circuit unit 23 to execute various processing according to the command information such as call processing, call closing processing or the like. Furthermore, the CPU 21 accesses a RAM (Random Access Memory) 24 which is a first storage means and makes it store designated information, or accesses an EEPROM (Electrically Erasable and Programmable Read Only Memory) 25 which is a second storage means to make it store various information such as outgoing history or telephone directory list which do not want to be erased when power is tuned off. The CPU 21 is made to execute each control described above based on program code stored in a ROM (Read Only Memory) 26.

Under control of the CPU 21, the transmission reception circuit unit 23 is made to transmit control signal via the antenna 3 to conduct the call processing, and to receive incoming call signal from the base station via the antenna 3 to notify the CPU 21 about the incoming call. When calling, the transmission-reception circuit unit 23 also transmits a voice signal inputted from the microphone 5 after performing designated signal processing, or demodulates the voice signal after performing designated signal processing for a reception signal to output to the speaker 4.

The jog dial 8 of the portable phone 1 may provide respective command information according to the rotating operations of the disc member 9, the pushing-in operation of the disc member 9, the pivoting operation in the push-down direction of the disc member 9 and the pivoting operation in the push-up direction of the disc member 9. Accordingly, various instruction operation may be performed with the jog dial 8 by operating the disc member 9 into the five directions. Functions conventionally allocated to the other operation keys, for example, clear of the decided item, shift-up of a menu hierarchy by one level, display of the catch menu during calling, etc., may be performed by operating only the jog dial 8 and not using the other operation keys 7. Accordingly, it is possible to perform instruction operations with a finger of the thumb or the forefinger while holding the phone in a hand, thereby extremely increasing convenience of handling.

Figure 8:
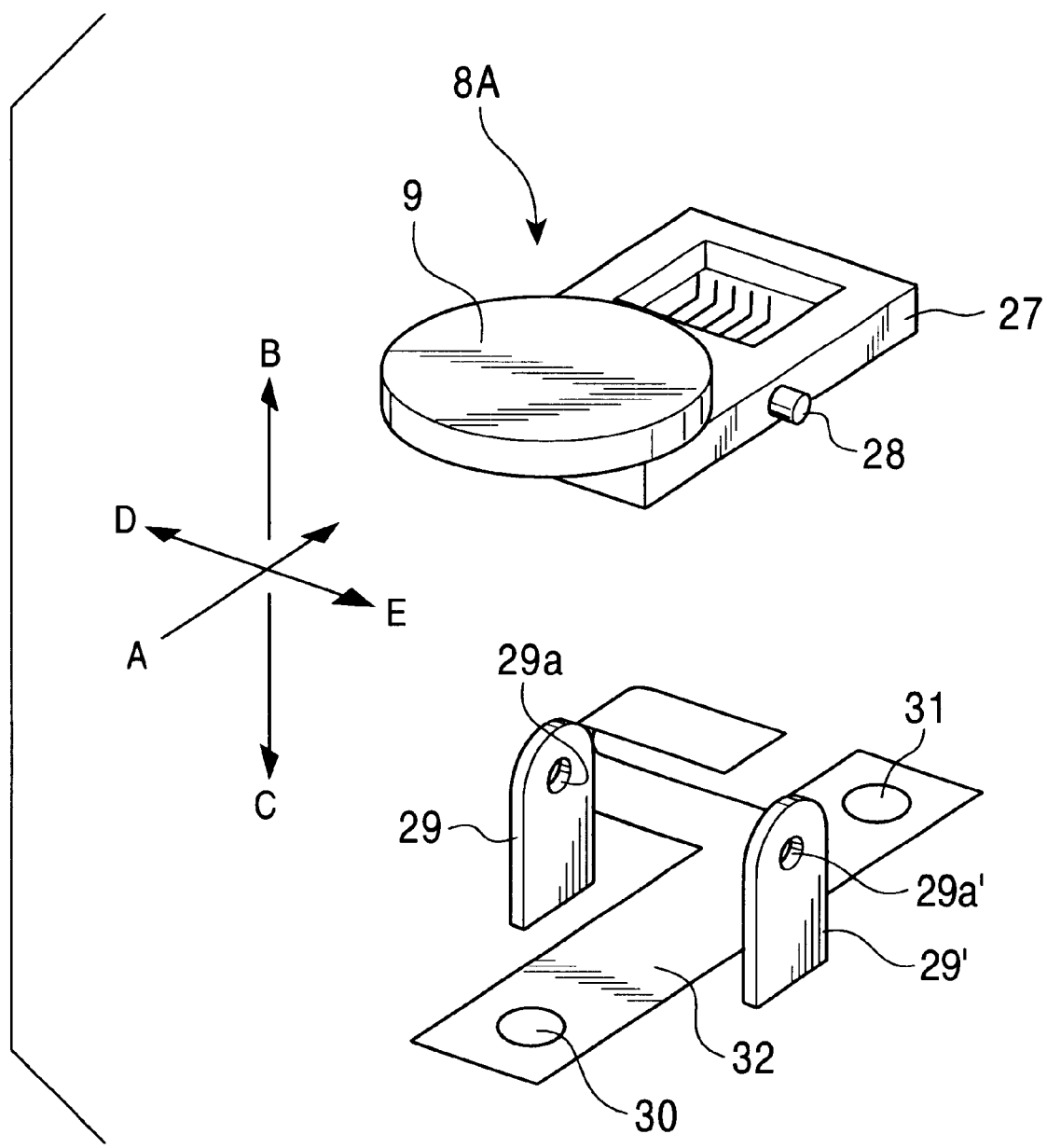
FIG. 8 is a schematic exploded perspective view showing an example of a switch apparatus according to an embodiment of the present invention.

FIG. 8 shows another example of a jog dial 8A.

In the embodiment described above, the second and the third switches 12, 13 are disposed in positions to sandwich the disc member 9, and there is an advantage that the space produced by disposition of the three switches may be made compact. In the present invention, the second and the third switches 12, 13 are not necessarily disposed in the positions to sandwich the disc member 9.

In the jog dial 8A of FIG. 8, the disc member 9 is supported on the base member 27 capable of rotating and moving to the pushing-in direction, namely, to an arrow A direction in the drawing, which is the same as the jog dial 8 of the embodiments described above. On the base member 27 is supported a first switch (not shown) which is operated by pushing the disc member 9 to an arrow A direction.

The base member 27 is made longer in the pushing-in direction. At about the midpoint thereof, protruding supported pins 28 (one of them is shown) are provided.

In the housing member, protruding supporting pieces 29, 29' are provided. In supporting holes 29a, 29a' of the protruding supporting pieces 29, 29', the supported pins 28, 28' of the base member 27 are supported allowing free pivoting movement. Sandwiched between the front side direction edge of the base member 27, namely, a position corresponding to the edge of the side where the disc member 9 is supported, and the backward edge (the other side of the front side edge) of the base member 27, switches 30, 31 are disposed at the positions respectively corresponding to the edge of the side where the disc member is supported and to the edge of the opposite side, sandwiching the supported pins 28. The switches 30, 31 are further supported by a flexible printed board 32, and the switch 30 serves as the second switch and the switch 31 serves as the third switch.

In the jog dial 8A, in addition to the rotating operation of the disc member 9 to two directions and the pushing-in operation of the disc member 9, the push-down operation of the disc member 9, namely, the operation to ove the disc member 9 to the arrow C direction in the drawing is made to pivot the base member 27 to push the second switch with the front side edge of the base member 27. Also, the push-up operation of the disc member 9, namely, the operation to move the disc member 9 to the arrow B direction in the drawing is made to pivot the base member 27 to push the third switch 31 with the backward edge of the base member 27.

Accordingly, also with the switch apparatus of this example, a variety of instruction operations may be performed by operating only the disc member 9.

Any of the shapes and the configurations of each part illustrated in the described embodiments and the examples thereto shows only an embodying example in carrying out the present invention, and it is to be understood that the technical scope of the present invention shall not be interpreted in a limited sense by these examples.

What is claimed is:

1. A switch apparatus comprising:
   a rotating operation unit for accepting a rotating operation and a pressing operation in a direction orthogonal to a rotation axis of said rotating operation, said rotating operation unit outputting a signal corresponding to a rotation movement of said rotating operation;
   a first push switch operated by said pressing operation of said rotating operation unit in said direction orthogonal to said rotation axis; and
   a second push switch and a third push switch disposed, respectively, on opposite sides and parallel to a rotation plane of said rotating operation unit, said second and said third push switches being operated by pivoting said rotating operation unit about a pivot axis perpendicular to said rotation plane of said rotating operation unit.

2. The switch apparatus according to claim 1, wherein said rotating operation unit comprises:
   a base member;
   a disc member attached to said base member such that said disc member is allowed to rotate and to be pressed in a direction orthogonal to said rotation axis of said rotating operation; and
   a detection circuit for detecting a rotation direction and a rotation angle of said disc member.

3. An electronic device including:
   a housing member;
   a rotating operation unit supported such that a portion of said rotating operation unit protrudes into said housing member, for accepting a rotating operation and a pressing operation in a direction orthogonal to a rotation axis of said rotating operation, said rotating operation unit outputting a signal corresponding to a rotation movement of said rotating operation;
   a first push switch disposed within said housing member and operated by said pressing operation of said rotating operation unit in said direction orthogonal to said rotation axis; and
   a second push switch and a third push switch disposed, respectively, on opposite sides and parallel to a rotation plane of said rotating operation unit within said housing member, said second and said third push switches being operated by pivoting said rotating operation unit about a pivot axis perpendicular to said rotation plane of said rotating operation unit.

4. The electronic device according to claim 3, wherein said rotating operation unit comprises:
   a base member;
   a disc member attached to said base member such that said disc member is allowed to rotate and to be pressed in a direction orthogonal to said rotation axis of said rotating operation; and
   a detection circuit for detecting a rotation direction and a rotation angle of said disc member.

5. A communication terminal apparatus comprising:
   a housing member;
   a rotating operating unit supported such that a portion of said rotating operating unit protrudes into said housing member, for accepting a rotating operation and a pressing operation in a direction orthogonal to a rotation axis of said rotating operation, said rotating operation unit outputting a signal corresponding to a rotation movement of said rotating operation;

a first push switch disposed within said housing member and operated by said pressing operation of said rotating operation unit in said direction orthogonal to said rotation axis;

a second push switch and a third push switch disposed, respectively, on opposite sides and parallel to a rotation plane of said rotating operation unit within said housing member, said second and said third push switches being operated by pivoting said rotating operation unit about a pivot axis perpendicular to said rotation plane of said rotating operation unit;

storage means for storing a plurality of items;

display means for displaying a plurality of said items read from said storage means; and control means for selecting and executing one of said items displayed on said display means and for selecting and executing a function require for communication corresponding to said rotation of said rotation operation unit and said operations of said first push switch, said second push switch, and said third push switch.

6. The communication terminal apparatus according to claim 5, wherein said rotating operation unit comprises:

a base member;

a disc member attached to said base member such that said disc member is allowed to rotate and to be pressed in a direction orthogonal to said rotation axis of said rotating operation; and a detection circuit for detecting a rotation direction and a rotation angle of said disc member.

* * * * *